(12) United States Patent
You

(10) Patent No.: US 11,833,599 B2
(45) Date of Patent: Dec. 5, 2023

(54) CUTTING MACHINE WITH CLAMP ASSEMBLY

(71) Applicant: REXON INDUSTRIAL CORP., LTD., Taichung (TW)

(72) Inventor: Wan Jie You, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 0 days.

(21) Appl. No.: 17/561,147

(22) Filed: Dec. 23, 2021

(65) Prior Publication Data
US 2022/0193803 A1 Jun. 23, 2022

(30) Foreign Application Priority Data
Dec. 23, 2020 (TW) .................. 109145780

(51) Int. Cl.
*B23D 47/04* (2006.01)
*B23D 47/02* (2006.01)
*B27B 25/10* (2006.01)

(52) U.S. Cl.
CPC .......... *B23D 47/04* (2013.01); *B23D 47/045* (2013.01); *B27B 25/10* (2013.01); *B23D 47/025* (2013.01); *Y10T 83/654* (2015.04)

(58) Field of Classification Search
CPC .......... B23Q 3/06; B23Q 3/10; B23D 47/025; B23D 47/045; B27C 5/06; B25B 5/127
USPC ...... 83/401, 409, 409.1, 460, 466, 454, 422, 83/435.11–435.14
See application file for complete search history.

(56) References Cited

U.S. PATENT DOCUMENTS

| | | | | | |
|---|---|---|---|---|---|
| 1,402,893 | A | * | 1/1922 | Sahlin ........................ | B25B 1/10 269/200 |
| 1,977,462 | A | * | 10/1934 | Van Berkel .............. | B26D 7/02 83/460 |
| 2,010,882 | A | * | 8/1935 | Ocenasek ............... | B27B 25/10 33/500 |
| 2,322,707 | A | * | 6/1943 | Wetzler .................... | B23Q 3/06 408/95 |
| 2,334,911 | A | * | 11/1943 | Drake ...................... | B23Q 3/06 269/92 |
| 3,521,683 | A | * | 7/1970 | Kirkpatrick .......... | B23D 47/025 144/21 |
| 4,133,237 | A | * | 1/1979 | Lewin ..................... | B27B 5/165 83/477.2 |

(Continued)

FOREIGN PATENT DOCUMENTS

WO WO-2012019005 A1 * 2/2012 ............. B23D 47/04
WO WO-2013171147 A1 * 11/2013 ............. B23D 47/04

*Primary Examiner* — Laura M Lee
(74) *Attorney, Agent, or Firm* — BACON & THOMAS, PLLC

(57) ABSTRACT

A cutting machine with clamp assembly includes a saw blade, a worktable, and a clamp assembly. The worktable is adjacent to the saw blade and can move along a processing axis relative to the saw blade. The worktable includes a tabletop facing the saw blade, a processing area set on the tabletop and extending along the processing axis and corresponding to the saw blade, and a chute recessed on the tabletop and extending in the direction of the processing area. The clamp assembly can be operated to move along the chute. The present invention uses the clamp assembly to firmly press against the workpiece, thereby assisting the positioning of the workpiece and ensuring the safety of the user.

4 Claims, 6 Drawing Sheets

(56) References Cited

U.S. PATENT DOCUMENTS

| | | | | |
|---|---|---|---|---|
| 4,155,283 A * | 5/1979 | Mericle | ............... | B27B 25/10 |
| | | | | 83/435.12 |
| 4,164,882 A * | 8/1979 | Mericle | ............... | B27B 25/10 |
| | | | | 83/438 |
| 4,292,870 A * | 10/1981 | Mericle | ............... | B27B 25/10 |
| | | | | 83/485 |
| 5,083,759 A * | 1/1992 | Pollak | ............... | B25B 5/103 |
| | | | | 269/134 |
| 5,873,292 A * | 2/1999 | Goese | ............... | B23D 33/08 |
| | | | | 83/917 |
| 5,918,520 A * | 7/1999 | Whitcomb | ........... | B23Q 3/002 |
| | | | | 83/435.11 |
| 6,662,699 B1 * | 12/2003 | Schmidt | ............... | B27G 5/026 |
| | | | | 83/765 |
| 7,942,174 B2 * | 5/2011 | Kozina | ............... | B23D 47/04 |
| | | | | 144/253.6 |
| 8,096,219 B2 * | 1/2012 | Potter | ............... | B26D 7/025 |
| | | | | 83/435.11 |
| 8,584,563 B1 * | 11/2013 | Kulas | ............... | B23B 47/28 |
| | | | | 83/441.1 |
| 2008/0277024 A1 * | 11/2008 | Kozina | ............... | B27B 25/10 |
| | | | | 83/13 |
| 2011/0067541 A1 * | 3/2011 | Potter | ............... | B23D 45/02 |
| | | | | 83/468.1 |
| 2019/0232400 A1 * | 8/2019 | Ender | ............... | B23D 47/025 |

\* cited by examiner

CUTTING MACHINE WITH CLAMP ASSEMBLY

BACKGROUND OF THE INVENTION

1. Field of the Invention

The present invention relates to a processing equipment, especially a cutting machine with clamp assembly.

2. Description of the Related Art

An existing sawing machine comprises a saw blade for cutting, and a worktable adjacent to the saw blade and movable relative to the saw blade, which is suitable for carrying a plate to be cut.

When using the sawing machine to cut the plate, in order to prevent the plate from being affected by the saw blade to deviate during the cutting process, the user must press the unprocessed part of the plate with the fingers or palm of the hand to keep the plate in position relative to the worktable. In order to avoid injury to the hand, it is necessary to select a part of the plate that the saw blade will not pass to press. However, when the area of the plate is small or the width is narrow, it will be difficult to apply force to the plate. In detail, it is because the part where the force can be applied becomes quite small, and naturally it cannot be pressed easily with the hand. If pressed with fingers, the plate may not be held in its position relative to the worktable because of the small force applied. In addition, the part where the force can be applied will be very close to the saw blade, posing a considerable threat to the safety of the user.

SUMMARY OF THE INVENTION

The present invention has been accomplished under the circumstances in view. It is the main object of the present to provide a cutting machine with clamp assembly, which has a better positioning effect and can improve safety Therefore, the cutting machine with clamp assembly of the present invention comprises a saw blade, a worktable, and a clamp assembly. The worktable is adjacent to the saw blade and movable relative to the saw blade along a processing axis. The worktable comprises a tabletop facing the saw blade, a processing area set on the tabletop and extending along the processing axis and corresponding to the saw blade, and a chute recessed on the tabletop and extending in the direction of the processing area. The clamp assembly can be operated to move along the chute.

The effect of the present invention is: The clamp assembly is firmly pressed against the work piece, thereby assisting the positioning of the work piece and ensuring the safety of the user.

DETAILED DESCRIPTION OF THE INVENTION

Figure 1:
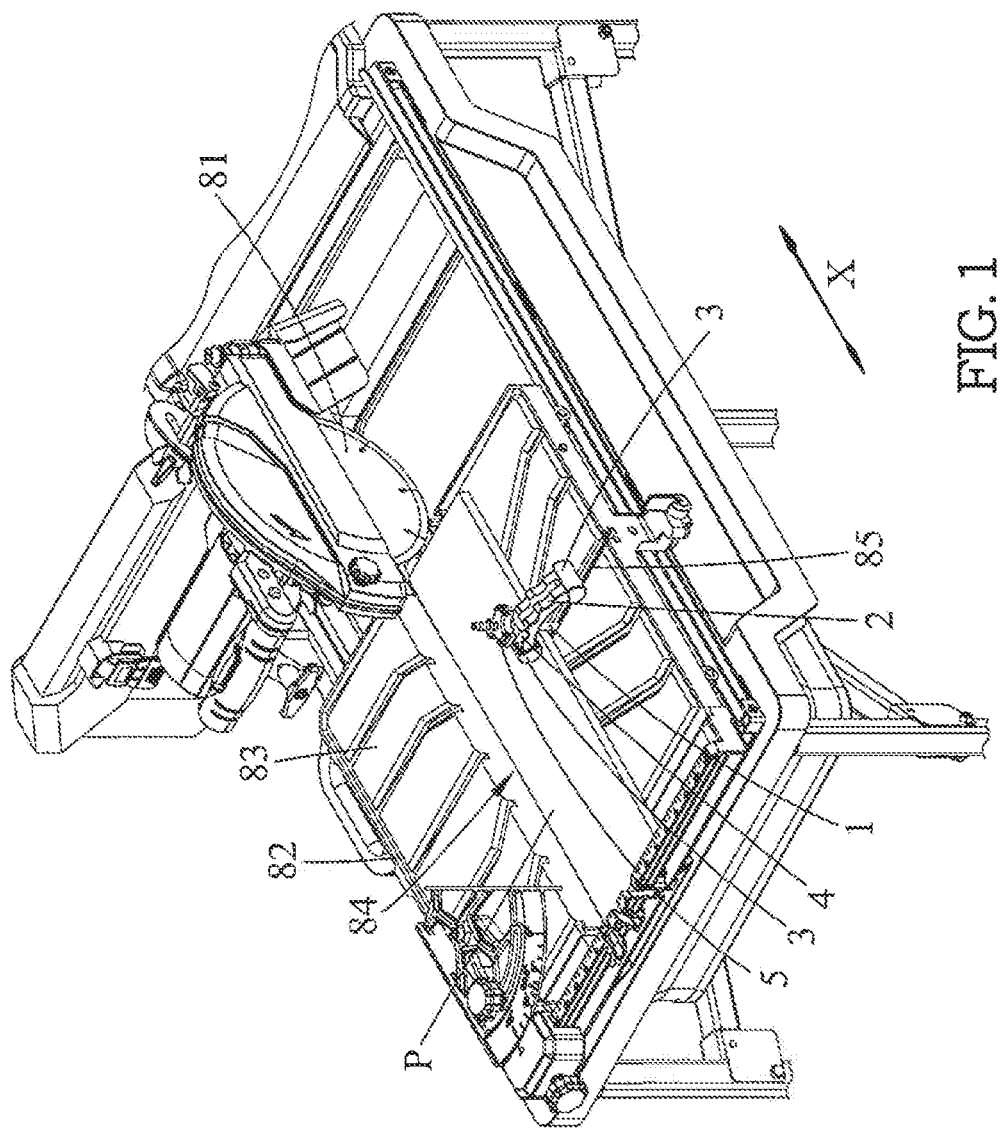
FIG. 1 is a partial elevational view illustrating an embodiment of the cutting machine with clamp assembly of the present invention where a workpiece is pressed against a tabletop.
Figure 2:
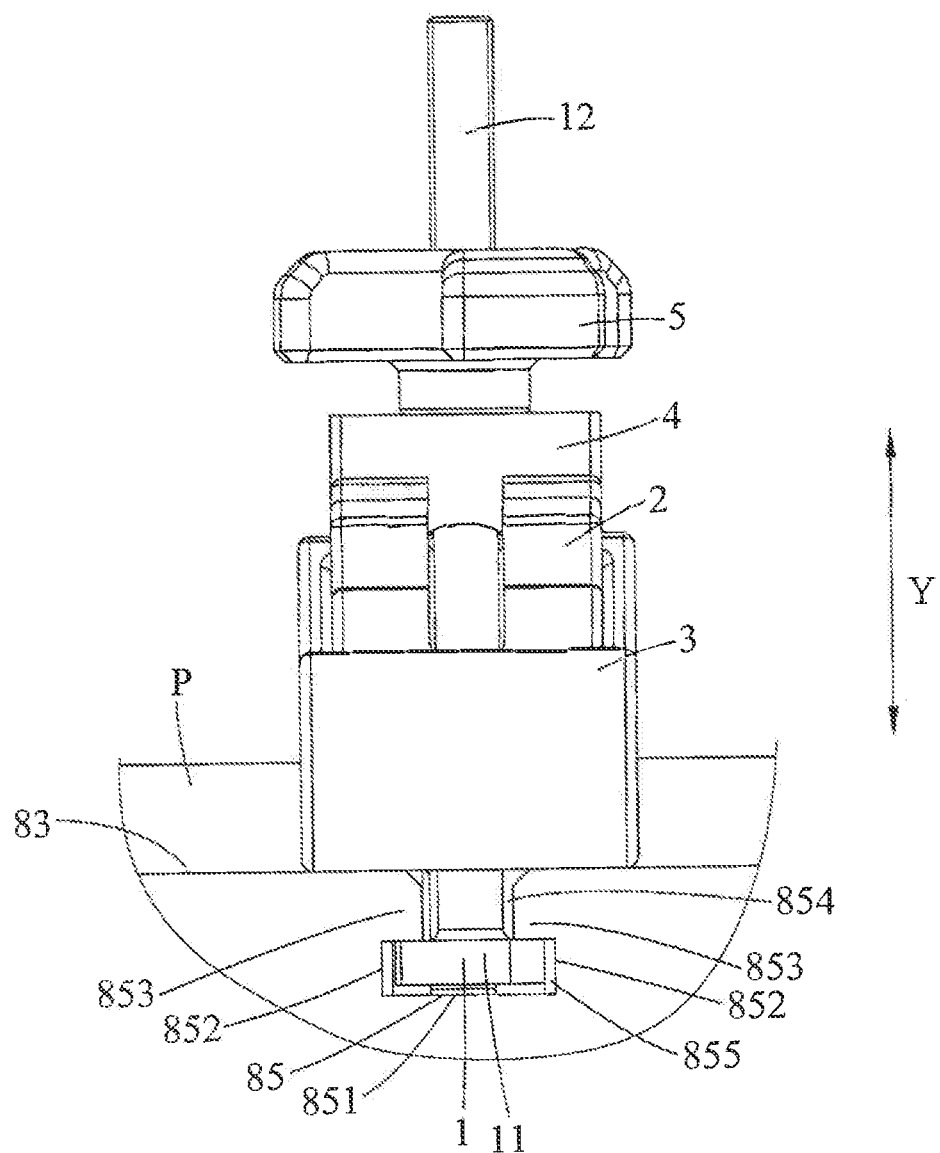
FIG. 2 is a partial side view illustrating the embodiment pressing the workpiece against the tabletop.

Referring to FIGS. 1 and 2, an embodiment of the cutting machine with clamp assembly of the present invention comprises a saw blade 81, a worktable 82 adjacent to the saw blade 81 and movable along a processing axis X relative to the saw blade 81, and a clamp assembly. The worktable 82 comprises a tabletop 83 facing the saw blade 81, a processing area 84 arranged on the tabletop 83 and extending along the processing axis X and corresponding to the saw blade 81, and a chute 85 recessed in the tabletop 83 and extending in the direction of the processing area 84. The chute 85 has a bottom surface 851, two side surfaces 852 respectively connected to two opposite sides of the bottom surface 851, and two limiting portions 853 formed by protruding the side surfaces 852 respectively. The limiting portions 853 are spaced apart from each other and jointly define a sliding gap 854 between each other. The bottom surface 851, the side surfaces 852, and the limiting portions 853 jointly define a limiting space 855 connected to the sliding gap 854.

Figure 3:
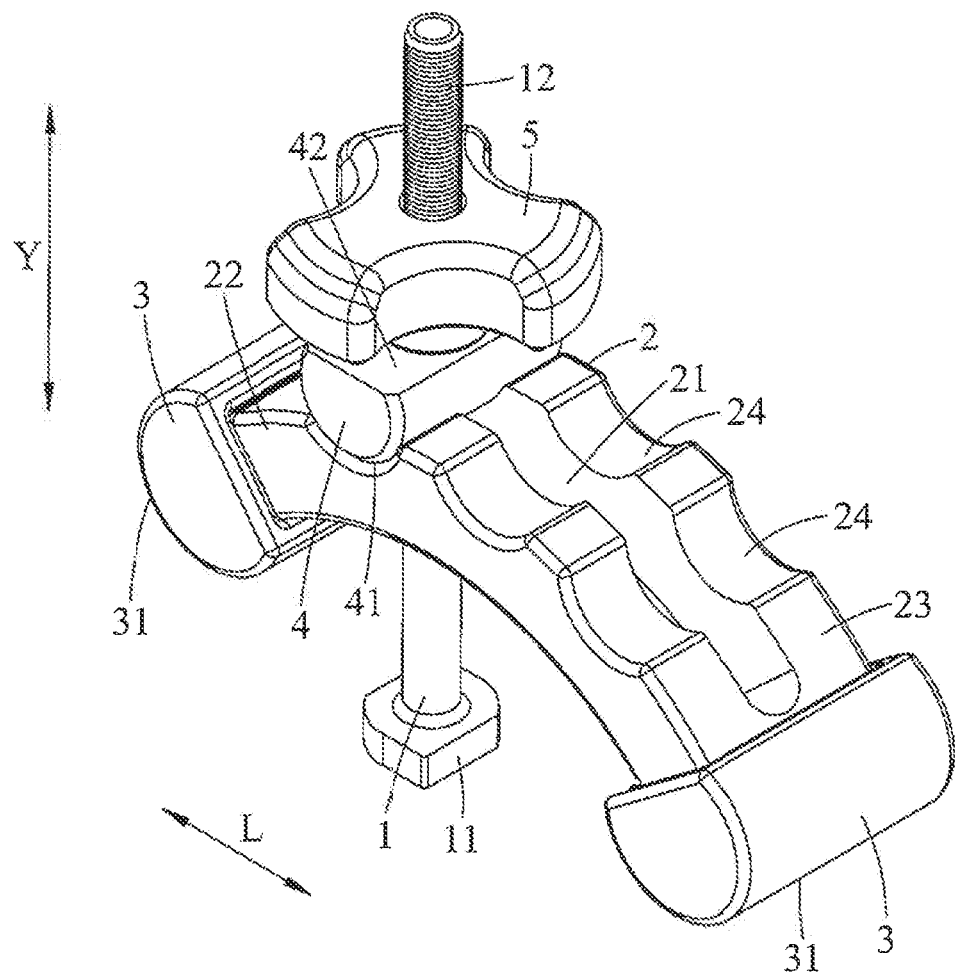
FIG. 3 is an elevational view of a clamp assembly of the embodiment.
Figure 4:
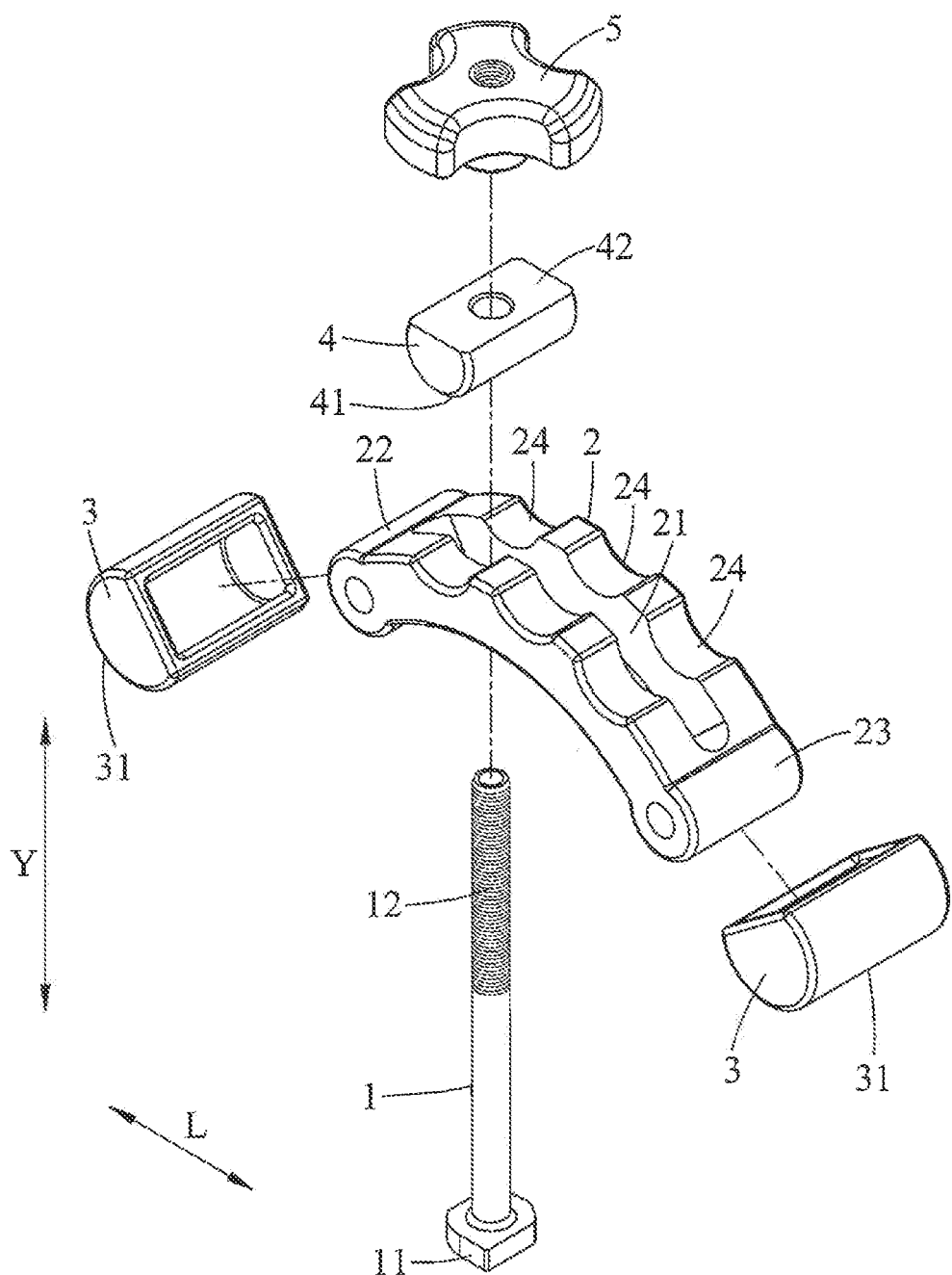
FIG. 4 is an exploded view of the clamp assembly.

Referring to FIGS. 2-4, the clamp assembly comprises a sliding shaft 1, a pressing member 2, an abutting member 4, an adjusting member 5, and two end sleeves 3.

The sliding shaft 1 comprises a sliding block 11 arranged in the limiting space 855, and a rod 12 connected to the sliding block 11 and passing through the chute 85 through the sliding gap 854. The sliding block 11 is held within the limiting space 855 by the limiting portions 853 and cannot be separated from the chute 85 along a lifting axis Y perpendicular to the tabletop 83. The outer peripheral surface of the rod 12 is provided with threads, and the rod 12 can be operated to move along the chute 85.

It should be particularly noted that in this embodiment, the sliding block 11 and the rod 12 are manufactured in an integrated manner, however, it can also be assembled by using nuts and bolts. This is just an example and should not be limited to this.

The pressing member 2 is curved and arched in a direction away from the tabletop 83, and comprises a through slot 21 that penetrates the pressing member 2 along the lifting axis Y and is provided for the rod 12 to be movably disposed therein, a first end 22 arranged along an extension axis L, a second end 23 opposite to the first end 22 along the extension axis L, and a plurality of arc-shaped indentations 24 arranged at intervals along the extension axis L and opening toward the side opposite to the tabletop 83. The through slot 21 is arranged between the first end 22 and the second end 23, and extends along the extension axis L. The end sleeves 3 are respectively set on the first end 22 and the second end 23 of the pressing member 2. Each end sleeve 3 has a contact surface 31 arranged on a side away from the pressing member 2. The contact surface 31 is arc shaped.

The abutting member 4 is adjacent to the pressing member 2 and is arranged on the side of the pressing member 2 opposite to the tabletop 83 along the lifting axis Y and is provided for the rod 12 to be movably installed. The abutting member 4 has a first surface 41 facing the pressing member 2, and a second surface 42 disposed on a side opposite to the first surface 41. In this embodiment, the second surface 42 is arc-shaped and the size matches the arc-shaped indentations 24.

The adjusting member 5 is provided for the rod 12 to pass through and is screwed to the rod 12 and can be operated and rotated. When the adjusting member 5 rotates, it will move along the lifting axis Y and move between a tight position and a relaxed position relative to the abutting member 4. In the tight position, the adjusting member 5 tightly abuts against the second surface 42 of the abutting member 4, so that the first surface 41 tightly abuts against the pressing member 2, wherein, the abutting member 4 tightly abuts against one of the arc-shaped indentations 24 through the first surface 41, so that the rod 12 of the sliding shaft 1 remains positioned along the extension axis L with respect to the pressing member 2. In the relaxed position, the adjusting member 5 moves away from or slightly touches the second surface 42 of the abutting member 4 so that the first surface 41 can move away from or slightly touch the pressing member 2.

Figure 5:
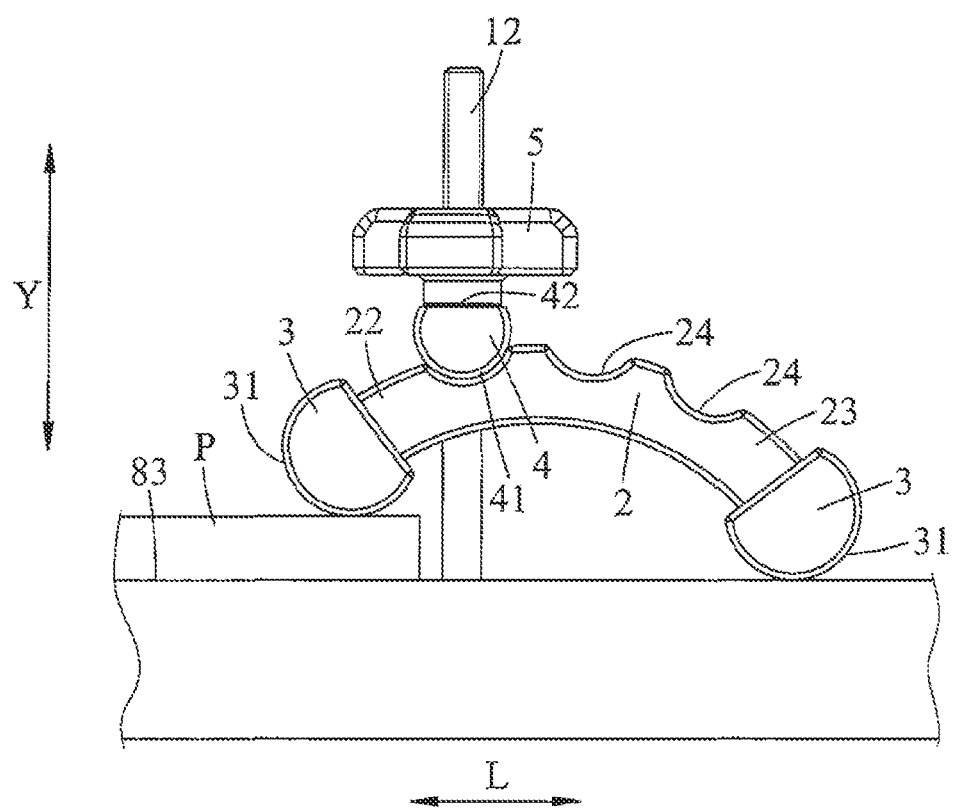
FIG. 5 is a schematic diagram illustrating the clamp assembly pressing a thicker workpiece against the tabletop.

Before using this embodiment, this embodiment should be adjusted to the relaxed position so that a workpiece P can be placed between the pressing member 2 and the tabletop 83 of the worktable 82. With the workpiece P placed on the tabletop 83, the position of the sliding shaft 1 and the pressing member 2 are adjusted so that the first end 22 or second end 23 of the pressing member 2 corresponds to a part of the workpiece P that needs to be pressed. For example, in this embodiment, the second end 23 is used as a fulcrum and the first end 22 corresponds to the part of the work piece P that needs to be pressed (as shown in FIG. 5). However, the user can also choose to use the second end 23 for pressing or use the first end 22 and the second end 23 for pressing at the same time, and this should not be limited.

It is worth noting that at this time the sliding shaft 1 can move along the chute 85, and the pressing member 2 can also slide along the extension axis L relative to the rod 12 of the sliding shaft 1. In addition, the pressing member 2 can also be rotated relative to the rod 12 to adjust the extension axis L. In this way, the user can arrange the workpiece P, the sliding shaft 1 and the pressing member 2 according to actual needs, and the degree of freedom of operation is quite high.

After completing the arrangement of the workpiece P, the sliding shaft 1 and the pressing member 2, the present embodiment can be moved to the tight position. In the tight position, since the adjusting member 5 tightly abuts the abutting member 4, the abutting member 4 will further tightly abut the pressing member 2 and the pressing member 2 will firmly press the workpiece P on the tabletop 83. In this way, the function of assisting the positioning of the workpiece P on the tabletop 83 is achieved, and the user does not need to continuously apply force with the palm or fingers. Compared with the prior art, this embodiment is not only more stable, but also labor-saving and safe.

After use, the user needs only to adjust the present embodiment from the tight position to the relaxed position to release the positioning relationship between the work piece P and the tabletop 83, so that the finished work piece P can be taken out.

It should be noted that in this embodiment, the workpiece P is a plate, but it can also be applied to blocks, sheets or other shapes of materials according to the needs of the user, and should not be limited to this.

In addition, the function of the end sleeves 3 is to prevent the first end 22 and the second end 23 from directly contacting the workpiece P and causing the workpiece P to be damaged. Specifically, in order to provide sufficient support, the pressing member 2 will preferably use a harder or more rigid material, such as metal. However, the workpiece P is not necessarily harder than the pressing member 2, so damage to the workpiece P may result. Therefore, the end sleeves 3 of this embodiment can be made of a more elastic material, such as rubber. In this way, the workpiece P can be prevented from being damaged and still provide sufficient support. Moreover, the user can also replace the end sleeves 3 according to the use requirements or the service life, without the need to replace the present embodiment as a whole, to achieve the effects of environmental protection and easy maintenance.

Figure 6:
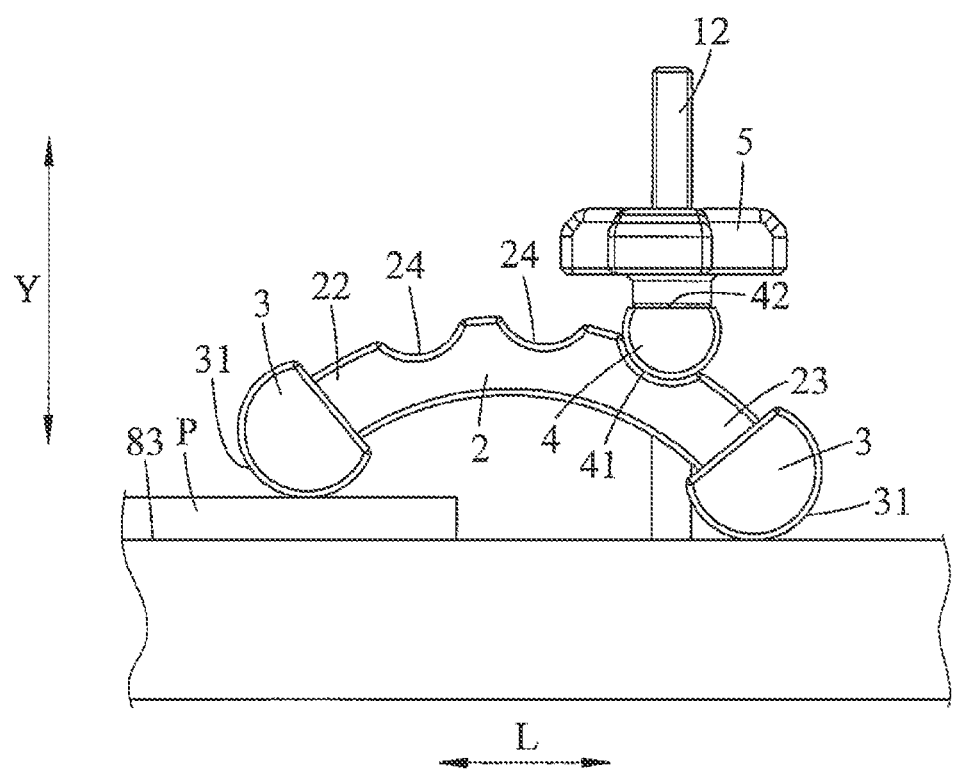
FIG. 6 is a schematic diagram illustrating the clamp assembly pressing a thinner workpiece against the tabletop.

In addition, the advantages of designing the pressing member 2 into an arch shape are: When this embodiment is applied to various workpieces P with different thicknesses (refer to FIGS. 5 and 6, FIG. 5 shows a thicker workpiece P, and FIG. 6 shows a thinner workpiece P), one of the first end 22 or the second end 23 can be used as a fulcrum and the other is pressed against the workpiece P, so that the first end 22 and the second end 23 are located at different heights. In addition, in this embodiment, in order to cooperate with this action, the first surface 41 of the abutting member 4 and the arc-shaped indentations 24 of the pressing member 2 are designed to be arc-shaped, so that when the pressing member 2 is inclined relative to the tabletop 83, the abutting member 4 can still freely correspond to any one of the arc-shaped indentations 24. In addition, the arc-shaped contact surface 31 of the end sleeve 3 is also conducive to corresponding to the aforementioned situation where the pressing member 2 is inclined.

In this way, in this embodiment, the adjusting member 5 can move between the tight position and the relaxed position, so that the pressing member 2 is firmly pressed against the workpiece P, thereby assisting the positioning of the workpiece P and protecting the user security.

In summary, in the cutting machine with clamp assembly of the present invention, the clamp assembly is firmly pressed against the workpiece P, thereby assisting the positioning of the workpiece P and ensuring the safety of the user, so it can indeed achieve the purpose of the invention.

However, the above are only examples of the present invention, and should not be used to limit the scope of implementation of the present invention. All simple equivalent changes and modifications made according to the scope of the patent application of the present invention and the content of the patent specification are still within the scope of the patent of the present invention.

What is claimed is:

1. A cutting machine with clamp assembly, comprising:
   a saw blade;
   a worktable adjacent to said saw blade and movable relative to said saw blade along a processing axis, said worktable comprising a tabletop facing said saw blade, a processing area set on said tabletop and extending along said processing axis and corresponding to said saw blade and a chute recessed on said tabletop and extending in the direction of said processing area; and
   a clamp assembly operable to move along said chute;
   wherein said chute of said worktable comprises a bottom surface, two side surfaces respectively connected to two opposite sides of said bottom surface and two protruding portions protruding from the side surfaces to form two limiting portions, said limiting portions being spaced apart from each other and jointly defining a sliding gap between each other, said bottom surface, said side surfaces and said limiting portions jointly defining a limiting space connecting said sliding gap, said clamp assembly comprising a sliding shaft, a pressing member, an abutting member and an adjusting member, said sliding shaft comprising a sliding block arranged in said limiting space and a rod connected to said sliding block and passing through said chute through said sliding gap, said sliding block being retained within said limiting space by said limiting portions to prevent separation of said sliding block from said chute along a lifting axis perpendicular to said tabletop, said rod being peripherally provided with threads and operable to move along said chute, said pressing member comprising a through slot that runs along said lifting axis and allows said rod to movably pass through, said abutting member arranged adjacent to said pressing member on a side of the pressing member opposite to said tabletop along said lifting axis, said abutting member comprising a first surface facing said pressing member and a second surface disposed on the side opposite to said first surface, said adjusting member movable along said lifting axis between a tight position and a relaxed position relative to said abutting member when rotating, wherein in said tight position, said adjusting member tightly abuts against said second surface of said abutting member so that said first surface tightly abuts against said pressing member, and wherein in said relaxed position, said adjusting member moves in a direction away from said second surface of said abutting member so that said first surface moves in a direction away from said pressing member;

wherein said pressing member of said clamp assembly bends and arches away from said tabletop; and wherein said pressing member of said clamp assembly also comprises a first end set along an extension axis, and a second end along said extension axis opposite to said first end; said through slot is arranged between said first end and said second end and extends along said extension axis, so that said pressing member is capable of sliding and rotating along said extension axis relative to said rod of said sliding shaft.

2. The cutting machine with clamp assembly as claimed in claim 1, wherein said pressing member of said clamp assembly also comprises a plurality of arc-shaped indentations arranged at intervals along said extension axis and opening towards the side opposite to said tabletop; said first surface of said abutting member is curved; wherein in said tight position, said abutting member tightly abuts against one of said arc-shaped indentations through said first surface, so that said rod of said sliding shaft remains positioned along said extension axis with respect to said pressing member.

3. The cutting machine with clamp assembly as claimed in claim 2, wherein said clamp assembly also comprises two end sleeves respectively set on said first end and said second end of said pressing member, each said end sleeve comprising a contact surface set on a side away from said pressing member, said contact surface being arc shaped.

4. The cutting machine with clamp assembly as claimed in claim 1, wherein said clamp assembly comprises a sliding shaft having a first end and a second end, a pressing member, an abutting member and an adjusting member, said sliding shaft having a first end retained in said chute and a second end extending upward from said chute and passing through said pressing member, said abutting member disposed on said sliding shaft above said pressing member, and said adjusting member threaded onto said sliding shaft above said abutting member;

wherein said adjusting member is movable along said sliding shaft towards and away from said abutting member by rotating the adjusting member, to selectively increase, decrease or remove a pressing force against said abutting member, whereby said pressing member is selectively clamped against or released from a workpiece placed on said tabletop.

* * * * *